(12) United States Patent
Kepa et al.

(10) Patent No.: US 10,706,179 B2
(45) Date of Patent: Jul. 7, 2020

(54) SECURE PROVISIONING OF SECRETS INTO MPSOC DEVICES USING UNTRUSTED THIRD-PARTY SYSTEMS

(71) Applicant: General Electric Company, Schenectady, NY (US)

(72) Inventors: Krzysztof Michal Kepa, Niskayuna, NY (US); Willard Monten Wiseman, Amsterdam, NY (US); David Safford, Clifton Park, NY (US); Wesley Michael Skeffington, Ballston Lake, NY (US); William David Smith, II, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 15/866,798

(22) Filed: Jan. 10, 2018

(65) Prior Publication Data

US 2019/0213359 A1 Jul. 11, 2019

(51) Int. Cl.

| | | |
|---|---|---|
| *G06F 21/72* | (2013.01) | |
| *G06F 21/73* | (2013.01) | |
| *G06F 21/57* | (2013.01) | |
| *H04L 9/08* | (2006.01) | |
| *H04L 9/32* | (2006.01) | |
| *H04L 9/06* | (2006.01) | |
| *G06F 21/60* | (2013.01) | |
| *H04L 9/30* | (2006.01) | |

(52) U.S. Cl.
CPC ............ *G06F 21/72* (2013.01); *G06F 21/572* (2013.01); *G06F 21/73* (2013.01); *H04L 9/0662* (2013.01); *H04L 9/0866* (2013.01); *H04L 9/0897* (2013.01); *H04L 9/3247* (2013.01); *H04L 9/3278* (2013.01); *G06F 21/602* (2013.01); *H04L 9/0869* (2013.01); *H04L 9/30* (2013.01)

(58) Field of Classification Search
CPC ........ G06F 21/72; G06F 21/572; G06F 21/73; G06F 21/602; H04L 9/0662; H04L 9/0866; H04L 9/0897; H04L 9/3247; H04L 9/3278; H04L 9/0869; H04L 9/30
See application file for complete search history.

(56) References Cited

U.S. PATENT DOCUMENTS

| | | | | |
|---|---|---|---|---|
| 2010/0042824 A1* | 2/2010 | Lee | ...................... | G06F 21/6218 713/2 |
| 2012/0137119 A1* | 5/2012 | Doerr | .................... | G06F 15/177 713/100 |
| 2014/0010371 A1* | 1/2014 | Khazan | ................. | G06F 21/602 380/278 |

(Continued)

*Primary Examiner* — Joseph P Hirl
*Assistant Examiner* — Stephen T Gundry
(74) *Attorney, Agent, or Firm* — Buckley, Maschoff & Talwalkar LLC

(57) ABSTRACT

The example embodiments are directed to a system and method for secure provisioning of secrets into MPSoC devices using untrusted third-party systems. In one example, the method includes generating a random number sequence from a true random number generator to produce secret information, storing the secret information in an on-chip secure storage, encrypting, in a device and using public key encryption, the secret information to generate an encrypted message, and transmitting the encrypted message to a third-party system.

20 Claims, 8 Drawing Sheets

(56) References Cited

U.S. PATENT DOCUMENTS

| | | | |
|---|---|---|---|
| 2014/0095876 A1* | 4/2014 | Smith | H04L 9/3265 |
| | | | 713/171 |
| 2014/0258736 A1* | 9/2014 | Merchan | G06F 21/62 |
| | | | 713/193 |
| 2015/0113278 A1* | 4/2015 | Cocchi | G06F 21/575 |
| | | | 713/171 |
| 2015/0113618 A1* | 4/2015 | Sinha | G06F 21/44 |
| | | | 726/6 |
| 2015/0242614 A1* | 8/2015 | Scagnol | H04L 43/065 |
| | | | 726/2 |
| 2016/0048684 A1* | 2/2016 | Kocher | G06F 21/602 |
| | | | 713/2 |
| 2016/0125187 A1* | 5/2016 | Oxford | G06F 21/575 |
| | | | 713/2 |
| 2016/0359636 A1* | 12/2016 | Kreft | G06F 21/71 |
| 2016/0364583 A1* | 12/2016 | Benoit | G06F 21/79 |
| 2017/0093567 A1* | 3/2017 | Gopal | H04L 9/0861 |
| 2017/0149572 A1* | 5/2017 | Wallrabenstein | H03K 19/17748 |
| 2017/0173262 A1* | 6/2017 | Veltz | A61M 5/1723 |
| 2017/0288867 A1* | 10/2017 | Collier | G06F 21/602 |
| 2018/0129801 A1* | 5/2018 | Cambou | G06F 21/44 |
| 2018/0129802 A1* | 5/2018 | Cambou | H04L 9/0866 |
| 2018/0196965 A1* | 7/2018 | Torres | G06F 21/125 |
| 2018/0351753 A1* | 12/2018 | Gardner | H04L 9/3278 |
| 2019/0012487 A1* | 1/2019 | Choi | H04L 9/32 |
| 2019/0026457 A1* | 1/2019 | Plusquellic | G06F 21/445 |
| 2019/0050605 A1* | 2/2019 | Kudelski | G06F 21/572 |
| 2019/0079878 A1* | 3/2019 | Chen | G06F 12/1408 |
| 2019/0095655 A1* | 3/2019 | Krawczewicz | H04L 9/32 |
| 2019/0385489 A1* | 12/2019 | Norrman | H04L 9/0631 |
| 2020/0076623 A1* | 3/2020 | Cambou | H04L 9/3278 |

* cited by examiner

SECURE PROVISIONING OF SECRETS INTO MPSOC DEVICES USING UNTRUSTED THIRD-PARTY SYSTEMS

BACKGROUND

Machine and equipment assets are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

As assets such as controllers for industrial control systems (ICS) are programmed with sensitive data (SD), it may be desirable or necessary to protect such sensitive data during production at potentially untrusted third-party system (e.g., an untrusted contracted manufacturer (CM) facility). Sensitive data includes, but is not limited to, secret key material (e.g., symmetric cryptographic key such as an Advanced Encryption Standard (AES) key) or credentials (e.g., private/public keypair) used to establish a hardware-based Root-of-Trust (RoT) that uses encryption and authentication to protect a software stack against tampering, information leakage, or misuse.

In a conventional way of secure provisioning of secrets, a Diffie-Hellman key exchange (DH) protocol is utilized which allows two parties that have no prior knowledge of each other to establish a shared secret key over an insecure communication channel. DH key-exchanges are traditionally prone to man-in-the-middle attacks and thus sensitive information are prone to interception. Concerns include data leakage, either by accident or by malicious intent, which can lead to loss of sensitive data and financial loss. Therefore, one challenge facing organizations is how to provision sensitive data without risking its exposure.

SUMMARY

Embodiments described herein improve upon the prior art by providing systems and methods which enable secure provisioning of sensitive data (e.g., secrets) into multiprocessor system-on-chip (MPSoC) devices in an unsecured environment. More specifically, embodiments described herein provide systems and methods which enable secure sensitive data transfer to and from a third-party system using hardware features of a Tier 1 candidate CPU (e.g., Xilinx MPSoC device and the like) to generate sensitive data locally, within the device, during controlled initialization. In this way, the need for secure delivery is eliminated as the sensitive data never leaves the device in plaintext.

Rather than using a scheme (e.g., DH key-exchange) in which a key is transmitted over a public channel and programmed into a device at a third-party system, the inventors have developed an approach where sensitive data/secrets are locally generated and stored, and transmitted out of the device in encrypted form. In this way, security of the data may be maintained by limiting the exposure of the data in unencrypted form.

In an aspect of an example embodiment, a computer-implemented method includes generating a random number sequence from a true random number generator to produce secret information, storing the secret information in an on-chip secure storage, encrypting, in a device and using public key encryption, the secret information to generate an encrypted message, and transmitting the encrypted message to a third-party system.

In an aspect of another example embodiment, a computing system includes a memory storing instructions, and a processor configured to execute the instructions, wherein the executed instructions cause the processor to generate a random number sequence from a true random number generator to produce secret information, store the secret information in an on-chip secure storage, seal the secret information by encrypting, in a device and using public key encryption, the secret information, and transmit the sealed secret information to a third-party system.

Among other advantages, the resulting system allows for controlled asset management which does not rely on trustworthiness of a third-party system since plaintext sensitive data is never exposed outside of the CPU in plaintext, allows local-generation and self-programming of sensitive data that is unique to a device but supports sensitive data sharing across devices, and provides necessary hardware features that do not exist in current x86 devices. Device-unique sensitive data mitigates against bulk-compromise of data (e.g., break once, use anywhere). Security costs are reduced due to the eliminated need for a trusted third-party system for device provisioning.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
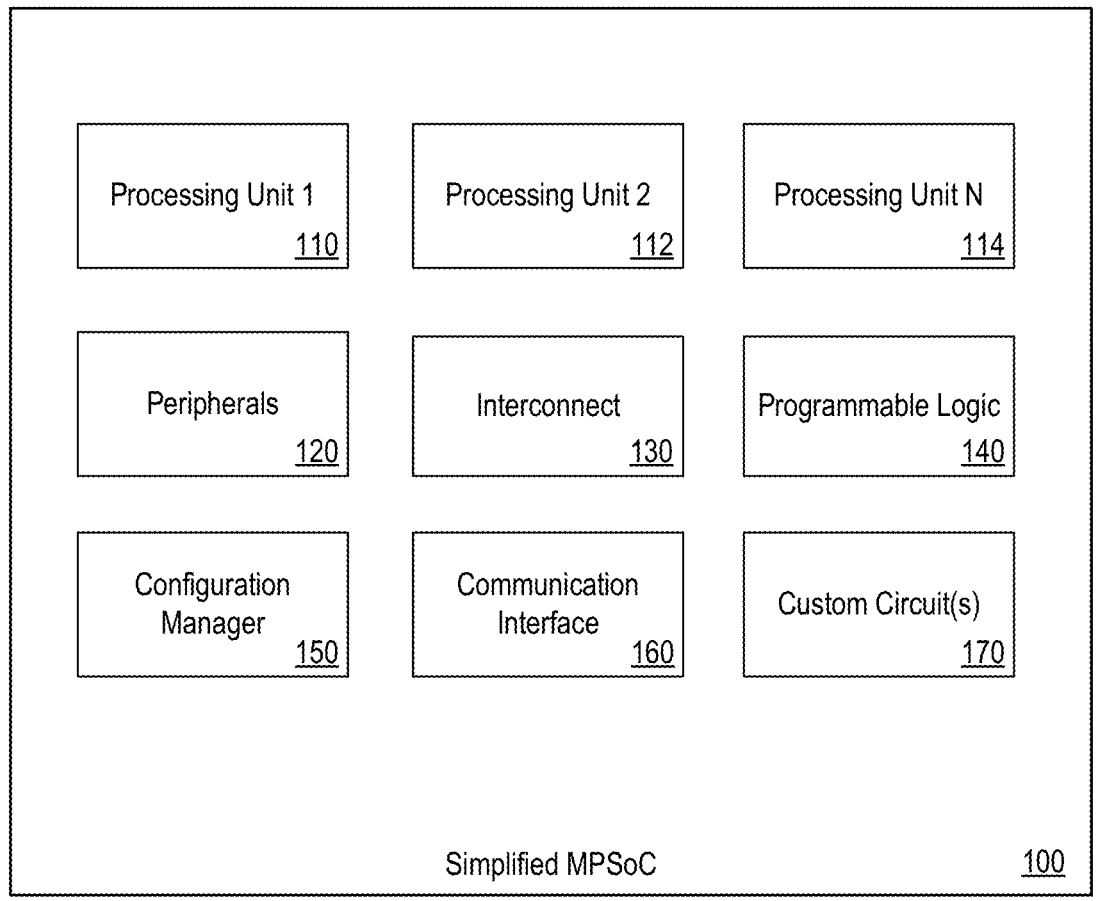
FIG. 1 is a block diagram illustrating a simplified multiprocessor system-on-chip (MPSoC) architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to a secure provisioning of secrets into MPSoC devices using untrusted third-parties.

An MPSoC is a system-on-a-chip which uses multiple processors, usually targeted for embedded application. The concept of an MPSoC, is known, but prior systems did not provide for the use of locally generated random secrets that are transmitted (encrypted) out of a device. Using a hardware random number generator and protected storage, the example embodiments enable the generation of random data used as secrets, which are generated locally on the MPSoC device. The secrets generated inside the chip are programmed and sealed using public key encryption before being transmitted outside of the chip. In this way, an untrusted third-party would not be able to retrieve the secrets without having the matching private key.

FIG. 1 is a block diagram illustrating a simplified multi-processor system-on-chip (MPSoC) architecture 100 in accordance with an example embodiment. The architecture incorporates a plurality of processing units 110, 112, 114, peripherals 120, interconnect 130 (through which the multiple components collaborate), programmable logic 140 (e.g., field programmable gate array (FPGA)), configuration manager (CM) 150, communication interface 160, and custom circuit(s) 170.

The processing units 110, 112, 114 execute software components (e.g., hypervisor, operating system, applications, etc.) and are configured by configuration manager 150 during system boot time or another processing unit during runtime. These processing units 110, 112, and 114 may include an application processing unit (APU), a real-time processing unit (RPU), and future processing units.

Programmable Logic 140 is configured by configuration manager 150 during system boot time or by another processing unit during runtime.

Configuration manager 150 executes firmware (e.g., configuration, security, and/or management boot code). The boot code may be immutable (e.g., boot read-only memory (boot ROM)) or mutable (e.g., user/vendor firmware). Configuration manager 150 verifies the integrity of hardware and configures processing unit(s) 110, 112, 114 and/or programmable logic 140 using a multi-image configuration file (e.g., BOOT.BIN boot image file). More specifically, the behavior is controlled by configuration of one-time programmable (OTP) or other non-volatile memory elements (e.g., Electronic Fuses (eFUSES)) from within the MPSoC device and settings inside the configuration file.

The images in the MPSoC configuration file (BOOT.BIN) may be selectively signed and/or encrypted. When verified boot is enforced (e.g., through eFUSES), only signed images are accepted as a valid configuration.

In some embodiments, the behavior of the configuration manager may include authentication (verify integrity and signature) of the configuration image using public-key cryptography, decryption of the encrypted configuration image using symmetric cryptography, enforcement of verified boot by allowing use of signed images only (activated by programming eFUSES, off by default), and enforcement of encrypted boot by allowing use of encrypted images only (activated by programming eFUSES, off by default).

Communication interface 160 comprising input/output (I/O) pins, peripherals, and protocols provide a bidirectional mechanism to communicate with external entities.

Custom circuit(s) include other hardware (e.g., optional specialized hardware) not described for carrying out or performing hardware/software functions.

It should be appreciated that the system 100 is merely an example and may include additional devices and/or one of the devices shown may be omitted.

Figure 2:
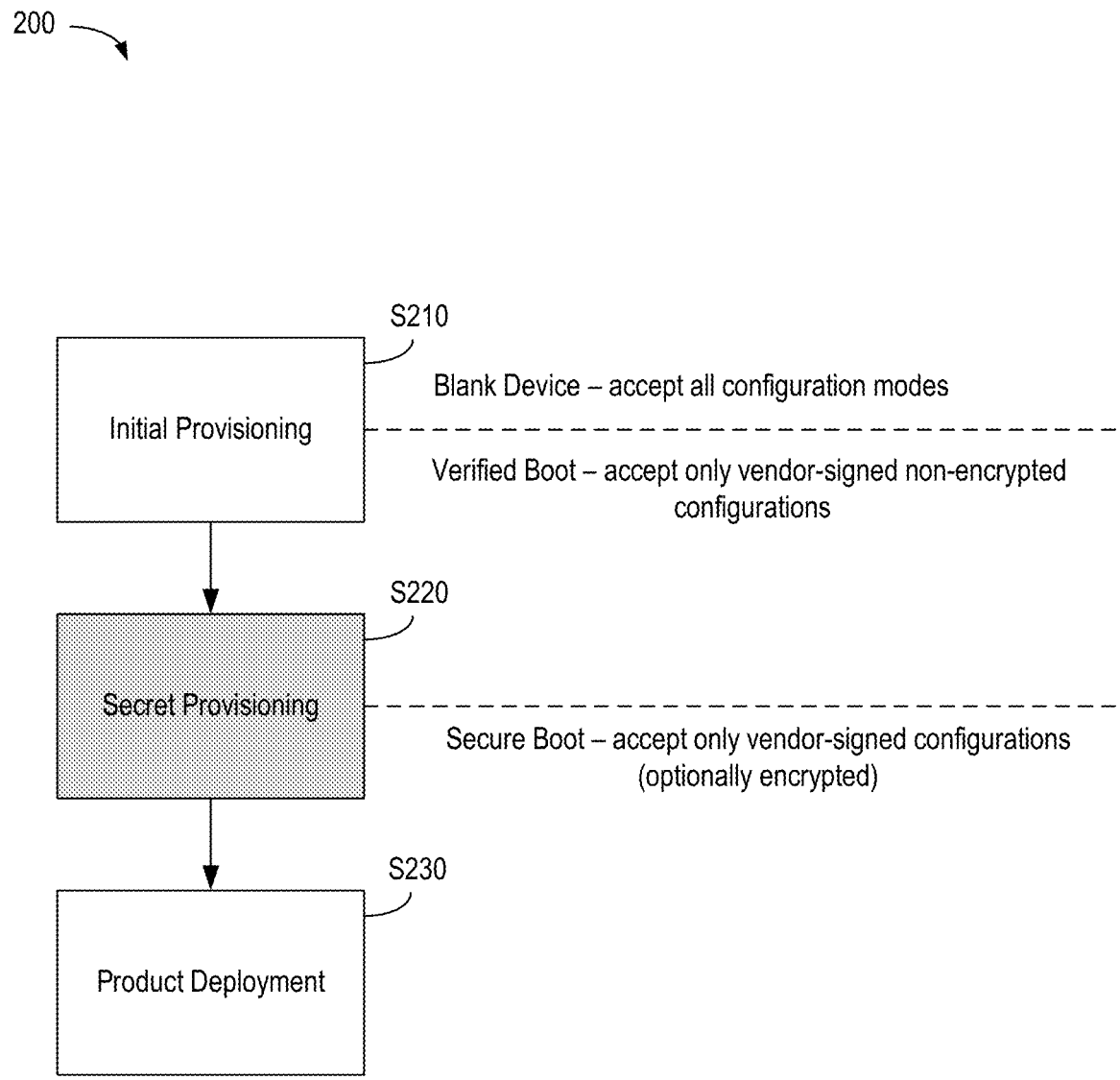
FIG. 2 is a block flow diagram illustrating a provisioning context to facilitate secret provisioning in accordance with an example embodiment.

FIG. 2 illustrates a provisioning context 200 to facilitate secret provisioning S220 (e.g., for product deployment S230) of devices in an untrusted environment, which includes preliminary initial provisioning S210.

Figure 3:
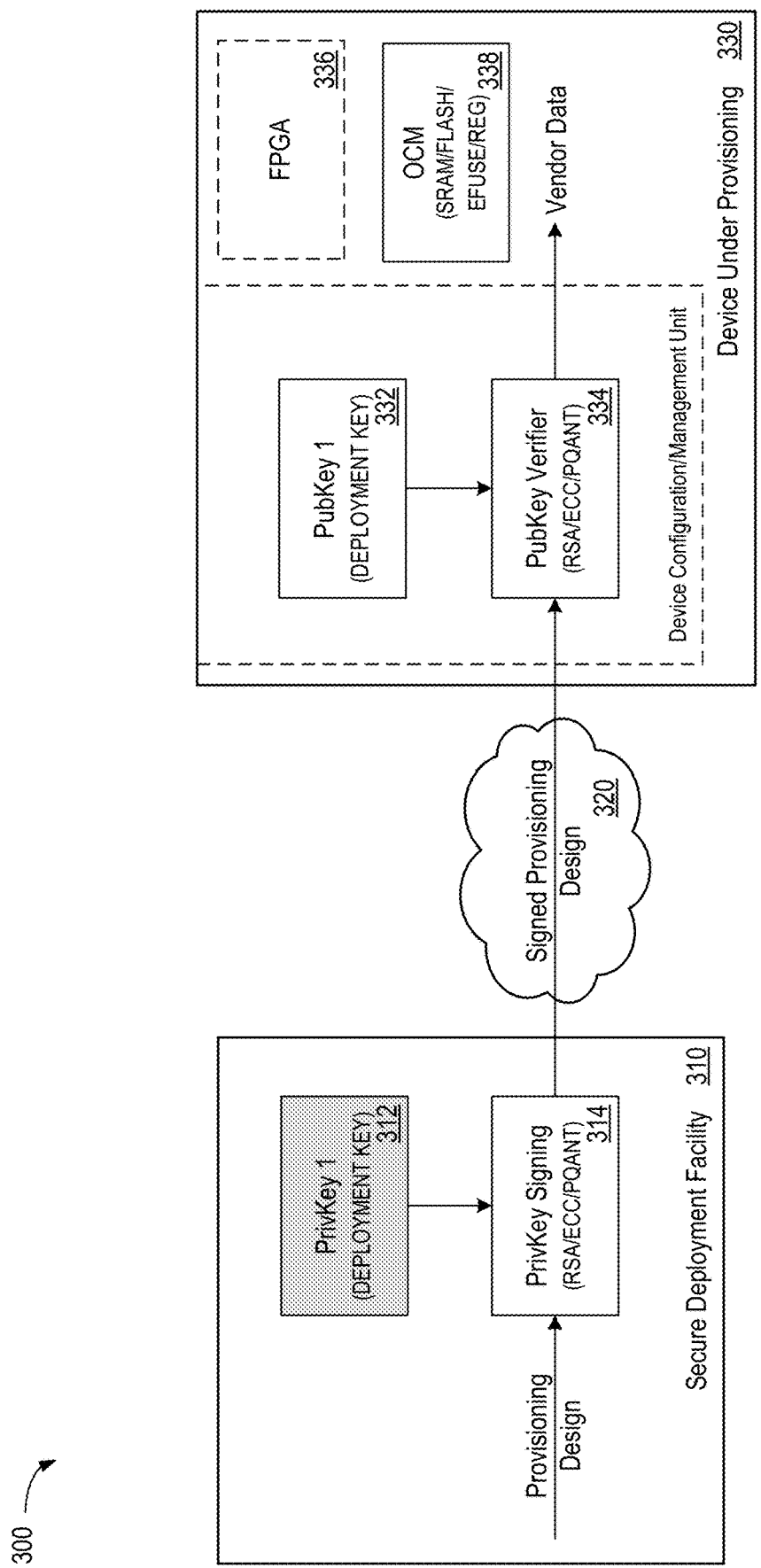
FIG. 3 is a block flow diagram illustrating the processing and transfer of the provisioning design in accordance with an example embodiment.

FIG. 3 illustrates product vendor-side preparation (e.g., at a secure deployment facility 310) of provisioning design 320 and transfer, over a public communication channel, to a device 330 located at a potentially untrusted system/facility such as an untrusted contracted manufacturer facility. For the purposes of this disclosure, a product vendor may generally refer to a vendor that incorporates the MPSoCs into one or more products (e.g., MPSoC-enabled devices) which are then made available to an end user.

Referring to FIGS. 2 and 3 together, as a preliminary step for secret provisioning, an asset/device under provisioning 330 is programmed with a public key 332, 334 (e.g., vendor "PubKey 1") and locked down during initial provisioning at S210 so that it accepts only firmware that is signed 314 by the matching private key 312 (e.g., vendor "PrivKey 1"). More specifically, in the MPSoC, a private key is used to sign the digest (unique hash/image identifier) of the configuration image. During verified boot, the digest is recomputed over the image data and the signature is verified using a public key enclosed in a certificate. In the case of a Xilinx MPSoC which uses a staged process, for example, images are signed using secondary keys, which (along with the secondary key ID) are then signed using primary keys. During boot, the authenticity of the primary public key is established by comparing its digest (hash of the primary public key) with the value that is permanently programmed into eFUSES during preliminary provisioning.

Device 330 includes memory device 338. Examples of memory device 338 include, without limitation, on-chip memory (OCM), Static Random Access Memory (SRAM), flash memory, eFUSES, or any other suitable memory device, or an electronic circuit (e.g., non-memory element) capable of storing data (e.g., either as a main function or side effect of circuit operation). Public-key algorithms/cryptosystems such as Rivest-Shamir-Adleman (RSA), elliptic curve cryptography (ECC) and post-quantum (PQUANT) cryptography may be used for encrypting data using a public key and decrypting data using a private key. Additionally or alternatively, in some embodiments, the device 330 includes programmable logic (e.g., FPGA) 336.

As shown in FIG. 2, a blank device which accepts all configuration modes (e.g., encrypted, unencrypted, verified, unverified, etc.) is configured to implement verified boot. Verified boot limits boot options to accept only those executables bearing a digital signature or certificate of a particular verifying authority (e.g., vendor-signed non-encrypted configurations). If firmware integrity is intact, then the boot will be allowed to continue. Otherwise, execution will not transfer to the next stage (e.g., secret provisioning S220) and the device will fail to boot and run.

Since no sensitive information or secrets are being programmed to the device, the initial provisioning process S210 may be performed by an MPSoC vendor or untrusted third-party. In some embodiments, a non-repudiable log trail is recorded indicating that the device was actually programmed.

Figure 4:
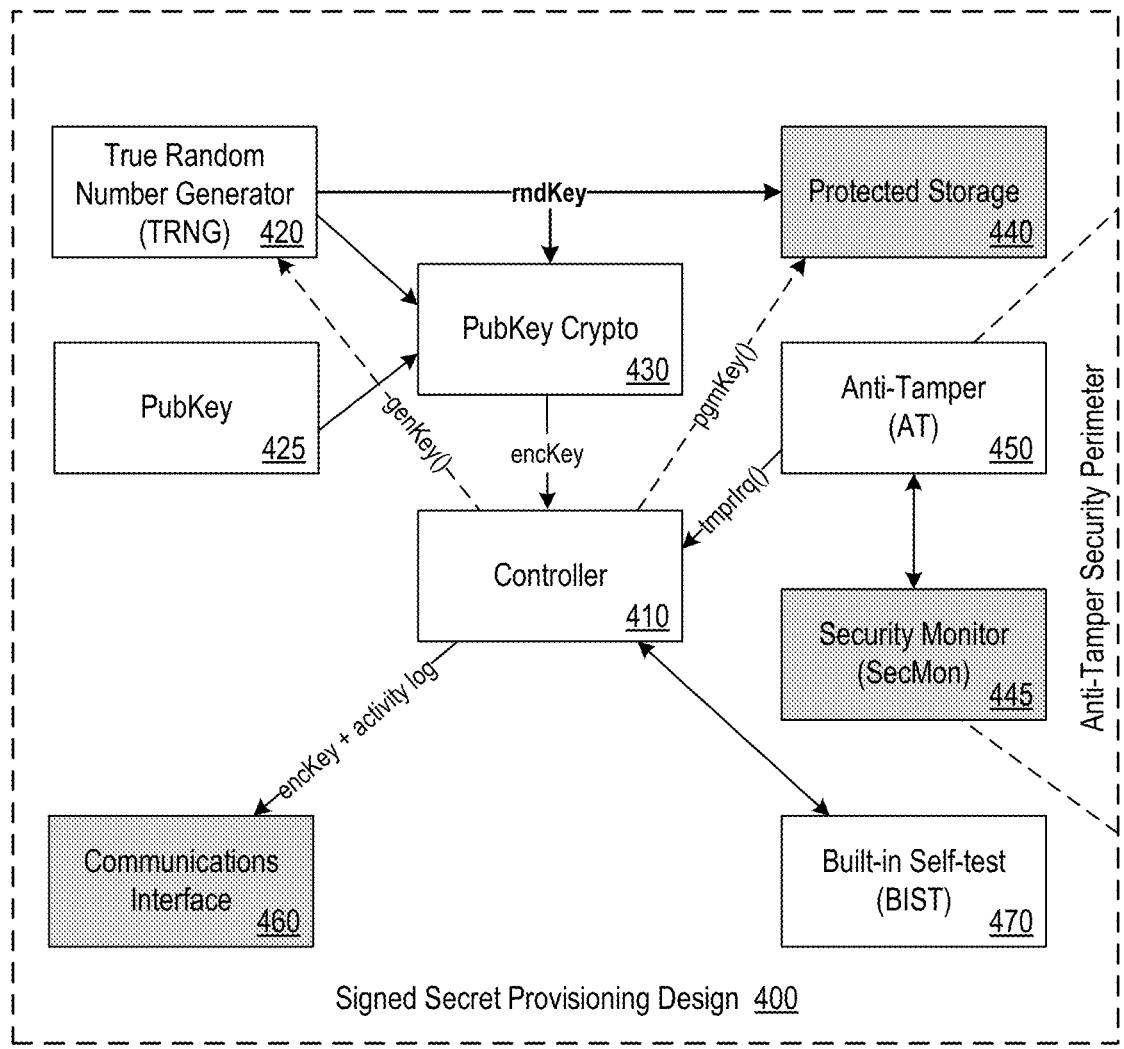
FIG. 4 is a block flow diagram illustrating a signed secret provisioning design in accordance with an example embodiment.

FIG. 4 illustrates a Xilinx MPSoC-specific signed provisioning design 400 that is loaded to the MPSoC for secret key provisioning. Silicon implementations for the MPSoC may include Xilinx Zynq® UltraScale™ MPSoC product families or other device implementing verified boot and capable of running provisioning design 400.

In the process of secret provisioning (e.g., S220) in accordance with some of the embodiments disclosed herein, a product vendor implements and signs provisioning firmware. As shown in FIG. 4, the signed provisioning design/firmware 400 comprises a combination of both hardware and software elements including true random number generator 420 (TRNG), provisioning public key (PubKey) 425, public key cryptography (PubKey Crypto) 430, protected storage 440, and communications interface 460. When the provisioning design is loaded into the MPSoC with enforced verified boot, its functional integrity is ensured by verified boot properties. Additionally or alternatively, although not required, the signed provisioning design/firmware 400 may include security monitor (SecMon) 445, anti-tamper (AT) monitoring circuit/module 450, and/or built-in self-test (BIST) 470.

Controller 410 orchestrates the interaction between the various components of the secret provisioning design and may be implemented in hardware (e.g., FPGA or custom dedicated hardware circuit) or software (e.g., running on a processor unit).

TRNG 420 generates a random bit stream (e.g., sequence of numbers) from a physical non-deterministic source. The output of the TRNG is used as a random key (e.g., secrets) that is programmed into protected storage 440. In this way, the random key never leaves the chip and is protected from external entities (e.g., protected from being read out). Forms of protected/secure storage on-chip 440 include non-volatile memory such as electrically one-time programmable electronic fuses (eFUSES), volatile memory such as battery-backed RAM (BBRAM), or other circuit that has the property of storing the state (e.g., of the data) either as a main function or side effect of its operation.

Public key cryptography block 430 consumes data from TRNG 420 and PubKey 425 and implements a public-key encryption algorithm. In public-key cryptography, or asymmetrical cryptography, a pair of keys are used: a public key which may be disseminated widely, and a private key which is known only to the owner. The public/private key pairs are used for authentication and encryption/decryption. The asymmetric property means that the public-key encryption allows anyone to use a public key to encrypt plaintext information into ciphertext, but only those who know the private key (e.g., owner) can decrypt the ciphertext back to the initial plaintext.

Security monitor 445 is a hardware element that operates independently within the MPSoC to monitor the healthiness of the silicon (e.g., temperature, power supply voltages, JTAG activity, self-checks on internal components, etc.). User-customizable penalties may be asserted due to off-chip events. Security monitor 445 builds an anti-tamper security perimeter around the chip/design.

Anti-tamper module 450, which is a standalone component that operates on its own rhythm, is responsible for ensuring that the MPSoC is operating within normal environmental limits. Anti-tamper module 450 monitors device health and activates programmed penalties (temporal or permanent) once triggered. For example, on-chip temperature and voltage monitor/alarms (SYSMON, FPGA logic) are used for hardware monitoring to prevent physical tampering of the MPSoC. In some embodiments, anti-tamper module 450 responds to tamper events by triggering a interrupt request (tmprIrq( )) to controller 410. BIST 470 works in cooperation with anti-tamper module 450 to perform various checks on the system to verify functionality and integrity of design operation.

Communications interface 460 includes a communications device for accessing a network via a communications link, and includes communication ports such as serial ports, parallel ports, Ethernet interface, Universal Serial Bus (USB) ports, and infra-red (IR) ports, or any other interface, component, or algorithm capable of transmitting the signal as a main function or side effect of circuit operation.

After a power cycle of a computing device, provisioning firmware tests device lock-down status, system integrity and all hardware and software components and, optionally, the autonomous anti-tampering monitoring circuit is started. On success, the provisioning firmware generates new set of secret data, programs it to the device and disables read-out after verifying that the programming was correct. On successful verification, the provisioning firmware uses the provisioning public key to encrypt the secret data and provisioning log, then transmits it off-chip using the communication interface and resets the system. Optionally and depending on the target application, the provisioning firmware can also lock-down the device further to accept only authenticated and encrypted firmware. In this way, assets are protected from running unauthenticated and unencrypted code.

Figure 5:
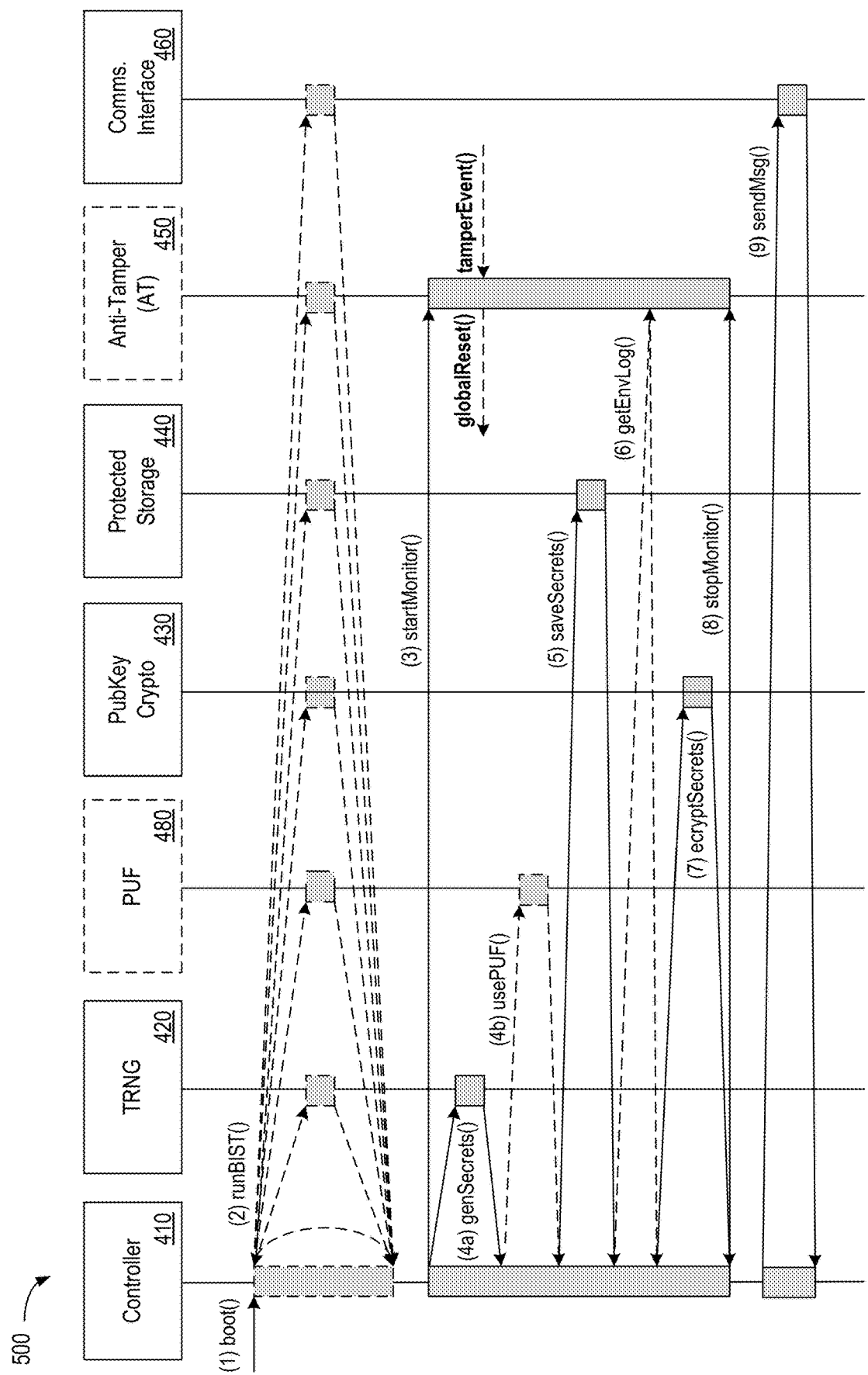
FIG. 5 is a block flow diagram illustrating the interaction between a controller and other components of the provisioning design in FIG. 4, in accordance with an example embodiment.

FIG. 5 is a flow diagram 500 illustrating the interaction between controller 410 and other components of the provisioning design in FIG. 4, in accordance with an example embodiment. More specifically, FIG. 5 illustrates a method for programming sensitive key material (or other sensitive data) into an MPSoC device such that the material is not disclosed to the programming entity (e.g., a contracted manufacturer).

Figure 6:
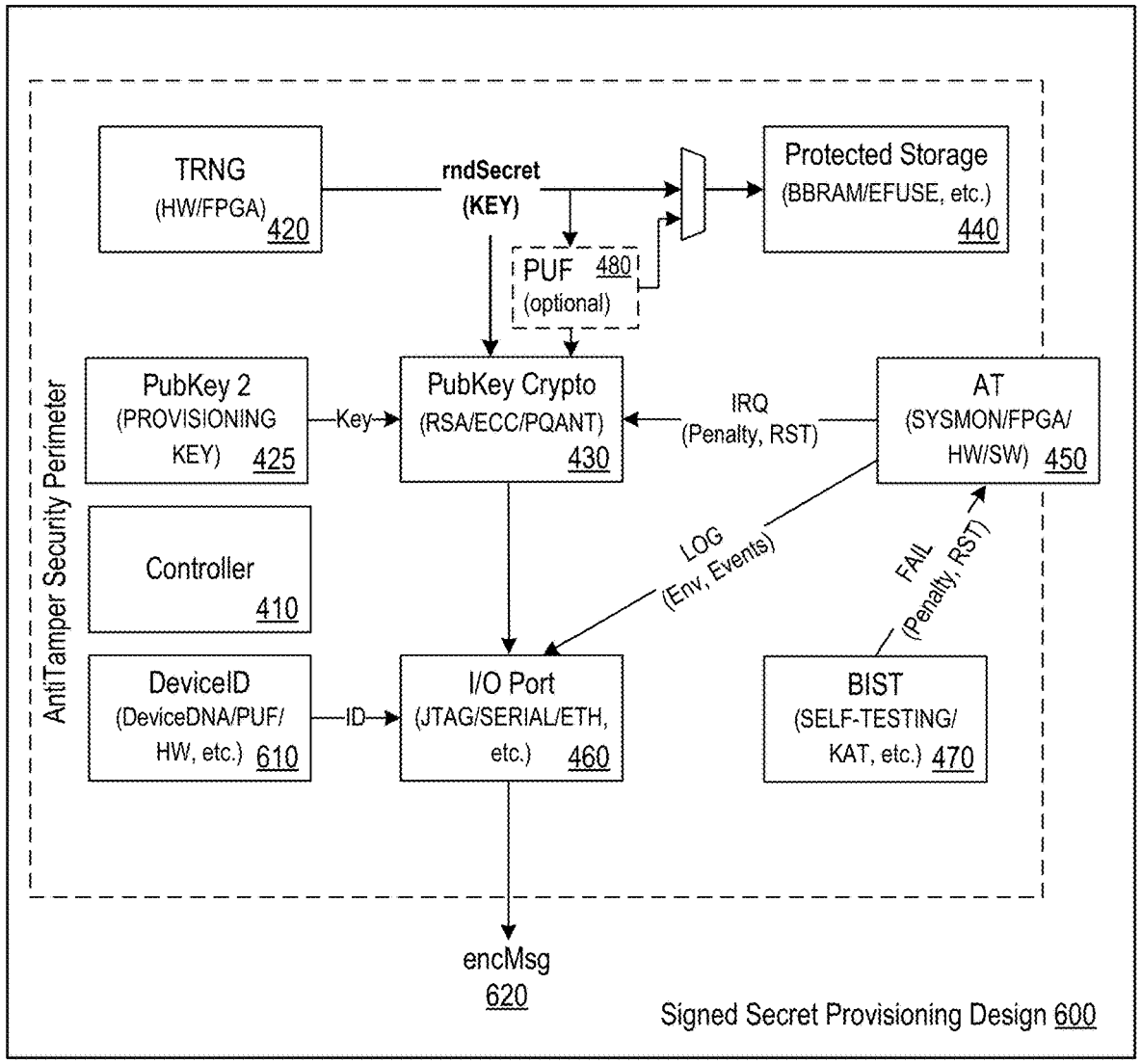
FIG. 6 is a block flow diagram illustrating the data flow between the provisioning design elements in an example embodiment.

FIG. 6 is a block diagram 600 illustrating the data flow between the provisioning design elements in an example embodiment.

As shown in FIGS. 5 and 6, and also referring to components in FIG. 4, at (1) a boot (e.g., start-up) process begins by controller 410 running a BIST test, at (2), on each of the components of the secret provisioning design (and on itself). The BIST (e.g., self-testing, Known Answer Test (KAT), etc.) tests whether the components are operating as expected. For example, a pass/fail signal may be asserted, indicating whether the device passed or failed the test. It should be appreciated that the runBIST( ) operations are optional and may be skipped in some embodiments.

At (3), a monitoring process is begun, which activates anti-tamper monitor 450 to start observing the chip environment and the chip healthiness and to detect tamper events should they arrive. In response to a tamper event, a global reset (GSR) or tamper interrupt request (tmprIrq( )) may be asserted to cause all MPSoC registers to be restored to their default state (e.g., erase all sensitive data in MPSoC).

At (4a), TRNG 420 (e.g., hardware random number generator or FPGA-based TRNG) is triggered to generate random values/numbers from a physical non-deterministic source. This random data/string of bits is used to generate secret information (e.g., random secret/key). The secrets are generated locally and stored locally, at (5), in protected storage 440 (e.g., BBRAM/eFUSES, etc.) in the MPSoC.

In some embodiments, a physical unclonable function 580 (PUF) is used, at (4b) to provide device-specific post-processing of the random values from TRNG 420. The PUF's operation is based on physical variations that occur in hardware devices that are hard to predict and/or practically impossible to duplicate.

In some embodiments, controller 410 gathers logged environmental data (e.g., environmental log history), at (6) from anti-tamper module 450. The environmental log data indicates the environmental context when the secrets were generated at (4a) and saved to protected storage at (5). This information ensures that the secrets were generated in an unaltered environment. If a degenerate or abnormal environment is found to be present, and therefore secrets generated by TRNG are no longer guaranteed to be random, the system autonomously shuts down or is shut down by controller 410. It should be appreciated that the getEnvLog( )operation is optional and may be skipped in some embodiments.

Using public key cryptography module 430, the secrets are encrypted using a public key (e.g., vendor PubKey). In some embodiments, the environmental log data, unique device identifier 610 (DeviceID, DeviceDNA, or PUF challenge-response pair(s)), and other data may also be encrypted at (7). The encrypted data (e.g., encrypted binary block) may be decrypted using only the corresponding private key.

Once the cryptographic packages are prepared and the secrets are encrypted, monitoring may stop at (8). The encrypted message 620 may be transmitted externally at (9) via communication interface 460 (e.g., sendMsg( ) operation). In this way, the generated random key never leaves the chip in unencrypted form, limiting the opportunity for tamper attacks or tamper attempts. Moreover, because public key cryptography is used the encrypted message cannot be read without possession of a private key (e.g., located at a facility separate from the device and the provisioning facility) that decrypts the message.

Figure 7:
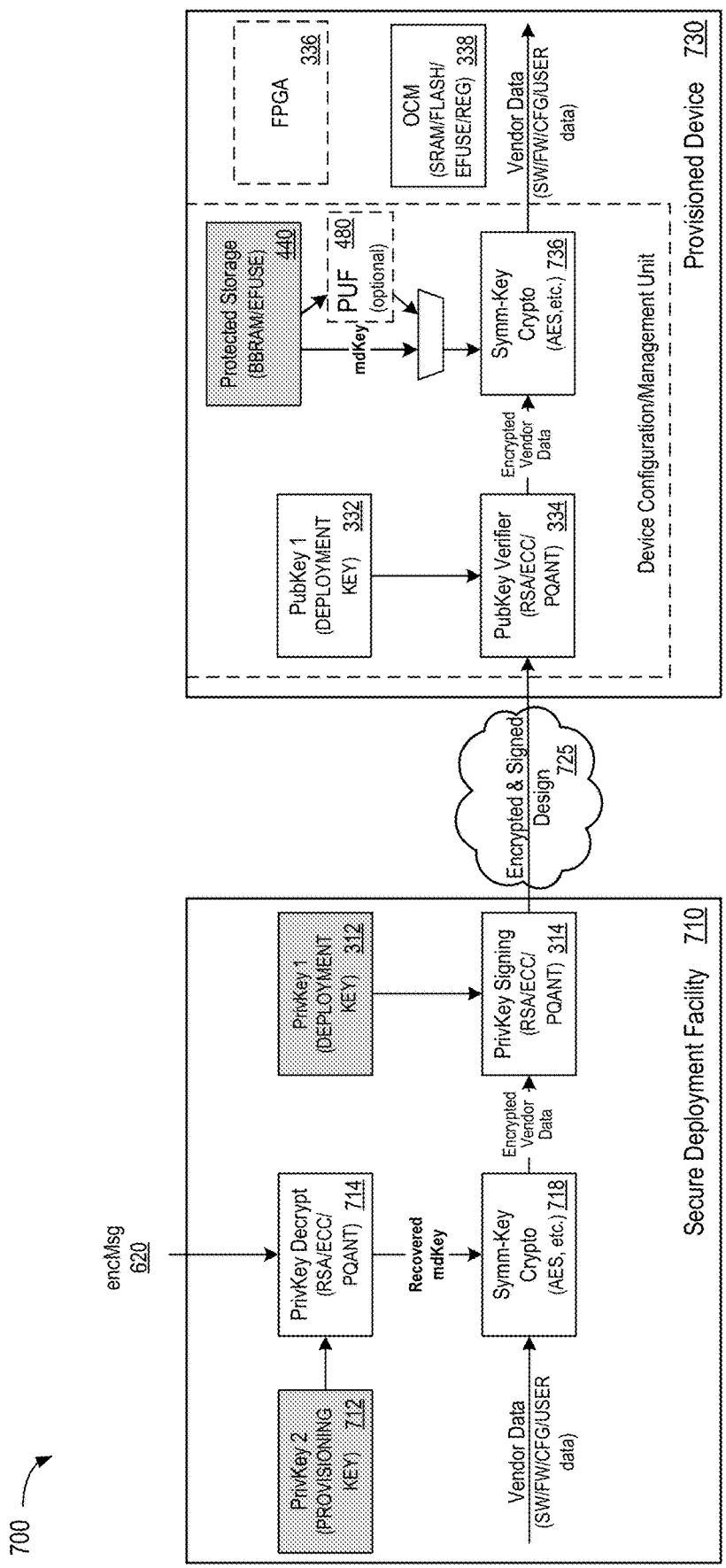
FIG. 7 is a block flow diagram illustrating a use case in accordance with an example embodiment.

FIG. 7 illustrates a use case in accordance with an example embodiment. More specifically, FIG. 7 illustrates secure deployment of sensitive vendor data using a provisioned device. This is process is two-stage, including sensitive data packaging (e.g., at a vendor secure deployment facility 710) and data deployment (e.g., in the provisioned device 730).

Generally, a product vendor may use a provisioning private key to decrypt secret data (SD) and recover the plaintext of the secret data. The product vendor may use a vendor public key to sign SD-encrypted/SD-enabled device-specific firmware (e.g., bootloader, software, application data, etc.) for deployment. Since the firmware is encrypted using SD that is known only to the vendor and the asset itself, it can be delivered to the asset using a public channel.

As shown in FIG. 7, at the sensitive data packaging stage, a product vendor at secure deployment facility 710 processes the encrypted message (encMsg) 620 received from the device under provisioning at a third-party untrusted system. The encrypted message contains secret key material that was encrypted by the provisioned device using the vendor's public key (e.g., "PubKey 2" 425) that is embedded in the provisioning design in FIGS. 4-6. The product vendor also performs analysis and integrity checks of the associated provisioning data (e.g., process log, device ID, device settings (temporal and permanent). Upon successful verification of the encrypted message 620, the random key material (RKM) is decrypted at 714 using a vendor private key (e.g., "PrivKey 2" 712). In some embodiments, "PrivKey 2" may be different from "PrivKey 1" 312, which was used to sign the provisioning design 314 in FIG. 3. Random key material 718 may be used to encrypt a deployment design or an optional primer/pilot design and signed 314 using the vendor private key (e.g., "PrivKey 1" 312, matching the public key "PubKey 1" 332 already provisioned to the device for the verified boot in the preliminary initial provisioning stage S210, as described above).

The deployment design 725 is vendor package (e.g., software, firmware, configuration, user data, etc.) that is deployed to the device at the untrusted contracted manufacturer facility.

The primer/pilot design is a zero-value design that does not contain sensitive vendor data and which is encrypted with random key material (SD). In some embodiments, the primer/pilot design is used to verify whether the device was indeed provisioned with random key material. In some embodiments, the primer/pilot design-based verification is performed by a vendor-trusted representative after the product with the programmed device is manufactured, but prior to deployment of valuable vendor data.

At the data deployment stage, the target device is populated with random key material. The encrypted and signed deployment design (including vendor intellectual property) 725 is delivered over a public channel to the untrusted contracted manufacturer and installed in the provisioned device 730 or the final product. During device/product verified boot, the device boot algorithm verifies the integrity of the design data, and if successful, prior to loading it to the destination location (e.g., volatile/non-volatile memory, registers, eFUSES, etc.), redirects the encrypted data through the symmetric cryptography engine 736 (e.g., Advanced Encryption Standard (AES)) that decrypts it using the provisioned random key material (mdKey) or its derivative (e.g., optional entangling process which may involve PUF circuit 480). Thereby, even if the device is provisioned at the untrusted third-party system, the data can be securely transmitted and deployed to the device using public channels and untrusted infrastructure of the third-party system (which may be the same third-party contracted manufacturer used for provisioning).

Figure 8:
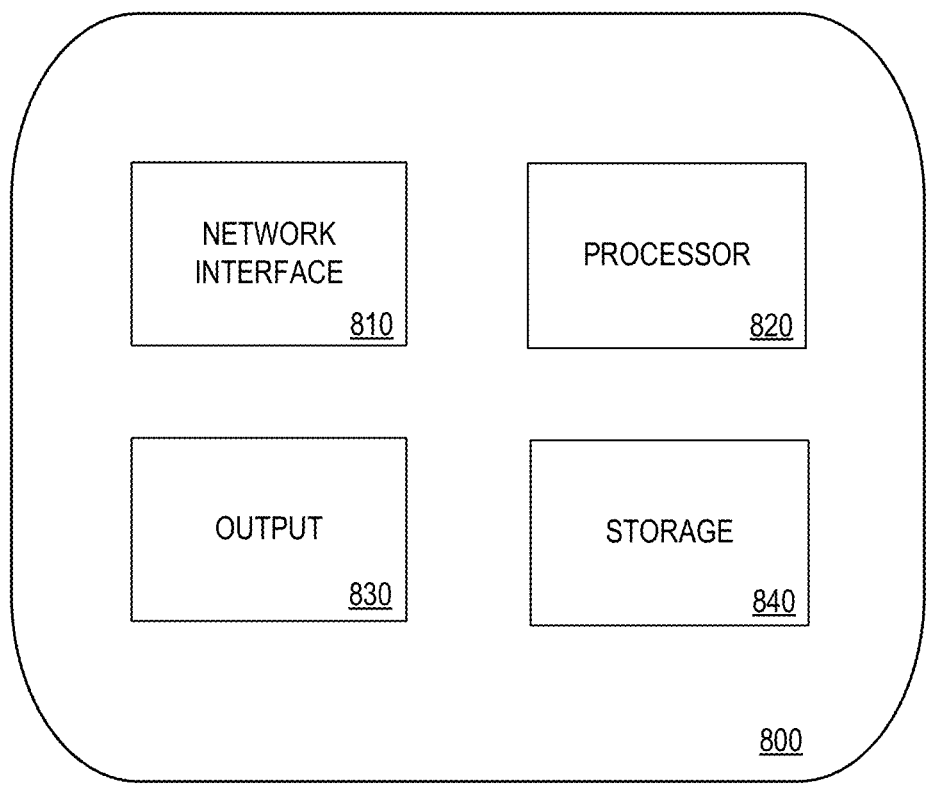
FIG. 8 is a block diagram illustrating a computing system in accordance with an example embodiment.

FIG. 8 illustrates a computing system 800 for a secret provisioning framework in accordance with an example embodiment. For example, the computing system 800 may be a database, cloud platform, streaming platform, user device, and the like. In some embodiments, the computing system 800 may be distributed across multiple devices. Also, the computing system 800 may perform the method of FIG. 5. Referring to FIG. 8, the computing system 800 includes a network interface 810, a processor 820, an output 830, and a storage device 840 such as a memory. Although not shown in FIG. 8, the computing system 800 may include other components such as a display, an input unit, a receiver, a transmitter, an application programming interface (API), and the like, all of which may be controlled or replaced by the processor 820.

The network interface 810 may transmit and receive data over a network such as the Internet, a private network, a public network, and the like. The network interface 810 may be a wireless interface, a wired interface, or a combination thereof. The processor 820 may include one or more processing devices of FIG. 1 each including one or more processing cores. In some examples, the processor 820 is a multicore processor or a plurality of multicore processors. Also, the processor 820 may be fixed or it may be reconfigurable. The output 830 may output data to an embedded display of the computing system 800, an externally connected display, a display connected to the cloud, another device, and the like. The storage device 840 is not limited to a particular storage device and may include any known memory device such as RAM, ROM, hard disk, and the like, and may or may not be included within the cloud environment. The storage 840 may store software modules or other instructions which can be executed by the processor 820 to perform the methods described herein. Also, the storage 840 may store software programs and applications which can be downloaded and installed by a user. Furthermore, the storage 840 may store and the processor 820 may execute an application marketplace that makes the software programs and applications available to users that connect to the computing system 800.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
   generating, by a multiprocessor system-on-a-chip, a random number sequence from a true random number generator to produce secret information;
   storing the secret information in an on-chip secure storage of the multiprocessor system-on-a-chip;
   encrypting, in a device of the multiprocessor system-on-a-chip and using public key encryption, the secret information to generate an encrypted message; and
   transmitting the encrypted message, from the multiprocessor system-on-a-chip, to a third-party system, wherein the secret information is inaccessible to the third-party system prior to the encrypting.

2. The computer-implemented method of claim 1, wherein the secure storage is one of a one-time programmable electronic fuses (eFUSES), a battery-backed RAM (BBRAM), and an electronic circuit.

3. The computer-implemented method of claim 1, further comprising, on system startup, commencing monitoring by a tamper detection circuit arranged to detect tamper events.

4. The computer-implemented method of claim 3, further comprising, prior to commencing monitoring by the tamper detection circuit, performing a built-in self-test (BIST) on the device.

5. The computer-implemented method of claim 1, further comprising, prior to system startup:
   commencing a verified boot of a processor on a platform;
   determining whether firmware is digitally signed and authorized to be loaded on the processor;
   in a case where the firmware is digitally signed and authorized, loading and executing the firmware on the processor; and
   in a case where the digitally signed firmware is not authorized, failing to boot the platform.

6. The computer-implemented method of claim 1, further comprising, prior to encrypting the secret information, retrieving environmental log data indicating an environmental context during production of the secret information and storage of the secret information in the on-chip secure storage.

7. The computer-implemented method of claim 1, wherein the random number sequence is processed using a physical unclonable function (PUF).

8. A computing system comprising:
a memory storing instructions; and
a processor configured to execute the instructions, wherein the executed instructions cause the processor to:
generate a random number sequence from a true random number generator to produce secret information;
store the secret information in an on-chip secure storage;
seal the secret information by encrypting, in a device and using public key encryption, the secret information; and
transmit the sealed secret information to a third-party system, wherein the secret information is inaccessible to the third-party system prior to the encrypting.

9. The computing system of claim 8, wherein the secure storage is one of a one-time programmable electronic fuses (eFUSES), a battery-backed RAM (BBRAM), and an electronic circuit.

10. The computing system of claim 8, further comprising, on system startup, commencing monitoring by a tamper detection circuit arranged to detect tamper events.

11. The computing system of claim 10, further comprising, prior to commencing monitoring by the tamper detection circuit, performing a built-in self-test (BIST) on the device.

12. The computing system of claim 8, further comprising, prior to system startup:
commencing a verified boot of a processor on a platform;
determining whether firmware is digitally signed and authorized to be loaded on the processor;
in a case where the firmware is digitally signed and authorized, loading and executing the firmware on the processor; and
in a case where the digitally signed firmware is not authorized, failing to boot the platform.

13. The computing system of claim 8, further comprising, prior to encrypting the secret information, retrieving environmental log data indicating an environmental context during production of the secret information and storage of the secret information in the on-chip secure storage.

14. The computing system of claim 8, wherein the random number sequence is processed using a physical unclonable function (PUF).

15. A non-transitory computer-readable medium having stored therein instructions that when executed cause a computer to perform a method comprising:
generating a random number sequence from a true random number generator to produce secret information;
storing the secret information in an on-chip secure storage;
encrypting, in a device and using public key encryption, the secret information to generate an encrypted message; and
transmitting the encrypted message to a third-party system, wherein the secret information is inaccessible to the third-party system prior to the encrypting.

16. The non-transitory computer-readable medium of claim 15, wherein the secure storage is one of a one-time programmable electronic fuses (eFUSES), a battery-backed RAM (BBRAM), and an electronic circuit.

17. The non-transitory computer-readable medium of claim 15, further comprising, on system startup, commencing monitoring by a tamper detection circuit arranged to detect tamper events.

18. The non-transitory computer-readable medium of claim 17, further comprising, prior to commencing monitoring by the tamper detection circuit, performing a built-in self-test (BIST) on the device.

19. The non-transitory computer-readable medium of claim 15, further comprising, prior to system startup:
commencing a verified boot of a processor on a platform;
determining whether firmware is digitally signed and authorized to be loaded on the processor;
in a case where the firmware is digitally signed and authorized, loading and executing the firmware on the processor; and
in a case where the digitally signed firmware is not authorized, failing to boot the platform.

20. The non-transitory computer-readable medium of claim 15, further comprising, prior to encrypting the secret information, retrieving environmental log data indicating an environmental context during production of the secret information and storage of the secret information in the on-chip secure storage.

* * * * *